US010021618B2

United States Patent
Morgan et al.

(10) Patent No.: US 10,021,618 B2
(45) Date of Patent: Jul. 10, 2018

(54) APPARATUS AND METHOD FOR CLOUD ASSISTED WIRELESS MOBILITY

(71) Applicant: Google Technology Holdings LLC, Mountain View, CA (US)

(72) Inventors: William Morgan, Wauconda, IL (US); Daniel Chisu, Franklin Park, IL (US); Dean Thorson, Grayslake, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 78 days.

(21) Appl. No.: 14/701,071

(22) Filed: Apr. 30, 2015

(65) Prior Publication Data
US 2016/0323799 A1    Nov. 3, 2016

(51) Int. Cl.
*H04W 36/30* (2009.01)
*H04W 28/02* (2009.01)
(Continued)

(52) U.S. Cl.
CPC ............. *H04W 36/30* (2013.01); *H04W 4/12* (2013.01); *H04W 8/02* (2013.01);
(Continued)

(58) Field of Classification Search
CPC ......... H04W 36/30; H04W 4/12; H04W 8/02; H04W 28/0268; H04W 36/0083; H04W 36/0088; H04W 48/14
See application file for complete search history.

(56) References Cited

U.S. PATENT DOCUMENTS 6,119,006 A * 9/2000 Shaffer ................. H04M 7/006
455/440
6,128,490 A    10/2000 Shaheen et al.
(Continued)

FOREIGN PATENT DOCUMENTS

EP    1060632 B1    1/2006
EP    1885144 A2    2/2008
(Continued)

OTHER PUBLICATIONS

Qualcomm Europe et al., "Text Proposal for UE Measurements for Minimizing Drive Tests," 3GPP draft R2-093175, San Francisco, California, US; Apr. 28, 2009.
(Continued)

*Primary Examiner* — Kashif Siddiqui
(74) *Attorney, Agent, or Firm* — Faegre Baker Daniels LLP

(57) ABSTRACT

A method and apparatus for providing wireless access to a radio access network for a user equipment (UE) obtains, at a server (102), a plurality UE upload cell messages from a plurality UEs (106) served by different cells (402). Each UE upload cell message includes cell specific data and corresponding UE specific data for a specific cell. The method and apparatus aggregate network cell data based at least on the cell specific data and the corresponding UE specific data (404). For example, the method and apparatus may aggregate the cell specific data and the corresponding UE specific data for each serving cell, such that the observances by the UEs are grouped together according to each serving cell. A UE may then receive cell information that is based on the aggregated network cell data (506) to, for example, re-order a scan list or cell roaming list, or bias a cell measurement.

11 Claims, 13 Drawing Sheets

(51) Int. Cl.
  *H04W 4/12* (2009.01)
  *H04W 48/14* (2009.01)
  *H04W 8/02* (2009.01)
  *H04W 36/24* (2009.01)
  *H04W 36/00* (2009.01)

(52) U.S. Cl.
  CPC ... *H04W 28/0268* (2013.01); *H04W 36/0088* (2013.01); *H04W 36/245* (2013.01); *H04W 48/14* (2013.01); *H04W 36/0083* (2013.01)

(56) References Cited

U.S. PATENT DOCUMENTS

| | | | |
|---|---|---|---|
| 6,201,968 B1 * | 3/2001 | Ostroff | H04W 8/245 455/436 |
| 6,381,315 B1 | 4/2002 | Nhaissi | |
| 6,633,761 B1 | 10/2003 | Singhal et al. | |
| 6,714,789 B1 | 3/2004 | Oh et al. | |
| 7,092,722 B1 | 8/2006 | Oh et al. | |
| 7,180,898 B2 | 2/2007 | Yoshida et al. | |
| 7,509,131 B2 | 3/2009 | Krumm et al. | |
| 7,809,360 B2 | 10/2010 | Agrawal et al. | |
| 7,848,292 B2 | 12/2010 | Bi et al. | |
| 8,131,317 B2 | 3/2012 | Lee | |
| 8,155,081 B1 | 4/2012 | Mater et al. | |
| 8,165,581 B2 | 4/2012 | Joshi et al. | |
| 8,200,217 B2 | 6/2012 | Kanade et al. | |
| 8,270,979 B1 | 9/2012 | Vargantwar | |
| 8,391,192 B2 | 3/2013 | Prakash et al. | |
| 8,477,645 B2 | 7/2013 | Scherzer et al. | |
| 8,484,568 B2 | 7/2013 | Rados et al. | |
| 8,542,637 B2 | 9/2013 | Bandhakavi et al. | |
| 8,565,766 B2 | 10/2013 | Scherzer et al. | |
| 8,590,023 B2 | 11/2013 | Gupta et al. | |
| 8,909,250 B1 | 12/2014 | Wang | |
| 9,565,578 B2 | 2/2017 | Chu et al. | |
| 2002/0169716 A1 | 11/2002 | Johnson et al. | |
| 2003/0227893 A1 | 12/2003 | Bajic | |
| 2004/0246920 A1 | 12/2004 | Savolainen | |
| 2005/0192031 A1 | 9/2005 | Vare | |
| 2005/0245269 A1 | 11/2005 | Demirhan et al. | |
| 2006/0098625 A1 | 5/2006 | King et al. | |
| 2006/0193295 A1 | 8/2006 | White et al. | |
| 2007/0037550 A1 | 2/2007 | Armstrong | |
| 2007/0064684 A1 | 3/2007 | Kottilingal | |
| 2007/0064894 A1 | 3/2007 | Armstrong et al. | |
| 2007/0127391 A1 | 6/2007 | Goodman | |
| 2007/0147317 A1 | 6/2007 | Smith et al. | |
| 2008/0002668 A1 | 1/2008 | Asokan et al. | |
| 2008/0009279 A1 | 1/2008 | Sakawa | |
| 2008/0122690 A1 | 5/2008 | Wan | |
| 2008/0176565 A1 * | 7/2008 | Eerolainen | H04W 48/16 455/436 |
| 2008/0122977 A1 | 9/2008 | Xu et al. | |
| 2008/0282080 A1 | 11/2008 | Hyndman | |
| 2009/0061862 A1 | 3/2009 | Alberth, Jr. et al. | |
| 2009/0168757 A1 | 7/2009 | Bush | |
| 2009/0298467 A1 | 12/2009 | Zohar | |
| 2010/0124886 A1 | 5/2010 | Fordham | |
| 2010/0172323 A1 | 7/2010 | Rexhepi et al. | |
| 2010/0304737 A1 | 12/2010 | Jain et al. | |
| 2011/0009135 A1 * | 1/2011 | Roskowski | H04W 36/0083 455/500 |
| 2011/0096673 A1 | 4/2011 | Stevenson et al. | |
| 2011/0216694 A1 | 9/2011 | Plasberg et al. | |
| 2011/0265156 A1 | 10/2011 | Bombay | |
| 2011/0269423 A1 | 11/2011 | Schell et al. | |
| 2011/0306318 A1 | 12/2011 | Rodgers et al. | |
| 2012/0094653 A1 | 4/2012 | Okuda | |
| 2012/0108206 A1 | 5/2012 | Haggerty | |
| 2012/0135711 A1 | 5/2012 | Jabara | |
| 2012/0178488 A1 | 7/2012 | Jonker et al. | |
| 2012/0195223 A1 | 8/2012 | Raleigh | |
| 2012/0196644 A1 | 8/2012 | Scherzer | |
| 2012/0282915 A1 | 11/2012 | Haynes et al. | |
| 2013/0155842 A1 | 6/2013 | Moore et al. | |
| 2013/0165117 A1 | 6/2013 | Narayanan | |
| 2013/0203438 A1 | 8/2013 | Shin | |
| 2013/0225169 A1 | 8/2013 | Farnsworth et al. | |
| 2013/0227647 A1 | 8/2013 | Thomas et al. | |
| 2013/0230023 A1 | 9/2013 | Gray et al. | |
| 2013/0303156 A1 | 11/2013 | Astrom et al. | |
| 2014/0071895 A1 | 3/2014 | Bane et al. | |
| 2014/0080539 A1 | 3/2014 | Scherzer et al. | |
| 2014/0104102 A1 | 4/2014 | Enge | |
| 2014/0127992 A1 | 5/2014 | Kuscher et al. | |
| 2014/0148100 A1 | 5/2014 | Kim et al. | |
| 2014/0148170 A1 | 5/2014 | Damji et al. | |
| 2014/0179340 A1 | 6/2014 | Do | |
| 2014/0211648 A1 | 7/2014 | Rahmati et al. | |
| 2014/0213256 A1 | 7/2014 | Meylan et al. | |
| 2014/0281532 A1 | 9/2014 | Jin | |
| 2014/0362713 A1 | 12/2014 | Agarwal | |
| 2014/0370910 A1 | 12/2014 | Natucci, Jr. | |
| 2015/0030157 A1 | 1/2015 | Segev | |
| 2015/0098393 A1 | 4/2015 | Tofighbakhsh et al. | |
| 2015/0127939 A1 | 5/2015 | Mazandarany et al. | |
| 2015/0141037 A1 | 5/2015 | Saha | |
| 2015/0195362 A1 | 7/2015 | Ong | |
| 2015/0256993 A1 * | 9/2015 | Bellamkonda | H04W 8/12 455/433 |
| 2015/0281198 A1 | 10/2015 | Lee et al. | |
| 2015/0312881 A1 | 10/2015 | Agrawal | |

FOREIGN PATENT DOCUMENTS

| | | |
|---|---|---|
| EP | 2244501 A1 | 10/2010 |
| GB | 2489537 A | 10/2012 |
| GB | 2489537 B | 10/2012 |
| WO | 2002-041580 A1 | 5/2002 |
| WO | 2004-047476 A1 | 6/2004 |
| WO | 2006005947 A1 | 1/2006 |
| WO | 2011162688 A1 | 12/2011 |
| WO | 2013/020598 A1 | 2/2013 |
| WO | 2013/044359 A1 | 4/2013 |
| WO | 2014-011094 A1 | 1/2014 |

OTHER PUBLICATIONS

Qualcomm Europe, "Framework for UE SON Reports," 3GPP draft S5-090017, Jan. 12, 2008.
CMCC, "Network Selection for WLAN/3GPP Radio Interworking," 3GPP draft R2-130973, Chicago, Illinois, US; Apr. 4, 2013.
European Patent Office, International Search Report and Written Opinion for PCT Application No. PCT/US2015/030775 (related to above-captioned patent application), dated Aug. 21, 2015.
Ge et al., "A History-Based Handover Prediction for LTE Systems" Computer Network and Multimedia Technology. CNMT. International Symposium on , vol., No., pp. 1,4, (Jan. 18-20, 2009).
Gemalto N.V. "Card Admin," Document Reference D1225357A (Jun. 2, 2011).
dicoda.com. "Multi IMSI," dicoda.com (Jun. 20, 2013) (available at: https://web.archive.org/web/20130620191315/http://www.dicoda.com/introduction/imsi).
Higginbotham, Stacey. "Is Apple About to Cut Out the Carriers?" gigaom.com (Oct. 27, 2010) (available at: http://gigaom.com/2010/10/27/is-apple-about-to-cut-out-the-carriers/).
Tobias, Marc Weber. "The Split Personality Cell Phone That Saves You Money on Overseas Calling," forbes.com (Aug. 20, 2013) (available at: http://onforb.es/14gMCe4).
"Circuit-switched fallback. The first phase of voice evolution for mobile LTE devices." Qualcomm Incorporated, 2012 11 pages.
CMSG. "Reprogrammable SIMs: Technology, Evolution and Implications," Final Report (Sep. 25, 2012) (available at: http://stakeholders.ofcom.org.uk/binaries/research/telecoms-research/reprogrammable-sims.pdf).
Korean Intellectual Property Office, International Search Report and the Written Opinion in International Application No. PCT/US2014/057709 dated Dec. 29, 2014.

(56) References Cited

OTHER PUBLICATIONS

Mobile Competence Centre; 650. Route Des Lucioles; F-06921 Sophia-Antipolis Cedex, vol. RAN WG2, No. Chicago, USA; Apr. 15, 2013 to Apr. 19, 2013; Apr. 4, 2013, XP050699128, Retrieved from the Internet: URL:http://www.3gpp.org/ftp/tsg-ran/WG2-RL2/TSGR2-81bis/Docs/.

Qualcomm Europe, "Framework for UE SON Reports," 3GPP TSG RAN WG3& SA WG5, No. S5-090017 Jan. 12, 2008 (Jan. 12, 2008), pp. 1-5, XP002588155, Retrieved from the Internet: URL:http://www.3gpp.org/ftp/tsg-sa/wg5-tm/Ad-hoc-meetings/2009-01-RAN3/Docs.

Qualcomm Europe et al., "Text proposal for UE Measurements for Minimizing Drive Tests" 3GGPP Draft; R2093175, 3rd Generation Partnership Project (3GPP). Mobile Competence Centre; 650. Route Des Lucioles; F-06921 Sophia-Antipolis Cedex; France, No. San Francisco, USA; Apr. 28, 2009, Apr. 28, 2009 (Apr. 28, 2009), XP050340887.

Levy, Marlyn, "Best-Practice Authentication Methods for Wi-Fi Offload," http://www.acurixnetworks.com/single-post/2013/05/20/BestPractice-Authentication-Methods-For-WiFi-Offload, May 20, 2013.

Bircher et al., "An Agent-Based Architecture for Service Discovery and Negotiation in Wireless Networks," University of Bern, Wired/Wireless Internet Comms. (WWIC), Jan. 21, 2004.

Silverman, Dwight, "Thinking of changing cellphone carriers? Check this app first," http://blog.chron.com/techblog/2011/06/thinking-of-changing-cellphone-carriers-check-this-app-first/, Houston Chronicle Techblog, Jun. 15, 2011.

VoLGA Forum, "VoLGA Stage 2 V1.7.0: Voice over LTE via Generic Access," Jun. 14, 2010.

Nikravesh et al., "Mobile Network Performance from User Devices: A Longitudinal, Multidimensional Analysis," Passive and Active Measurement: 15th International Conference, PAM 2014, Mar. 10-11, 2014.

U.S. Patent and Trademark Office; Final Rejection; U.S. Appl. No. 14/308,341; dated Jul. 18, 2016.

U.S. Patent and Trademark Office; Non-Final Rejection; U.S. Appl. No. 14/308,341; dated Jan. 21, 2016.

\* cited by examiner

QUERY MESSAGE

| Field | Description |
|---|---|
| QUERY COUNT | NUMBER CELL QUERIES CONTAINED IN THIS MESSAGE |
| MCC | MOBILE COUNTRY CODE. 310=USA |
| MNC | MOBILE NETWORK CODE. 410=AT&T, 026=TMOBILE, ETC.... |
| RAT | RADIO ACCESS TECHNOLOGY. 0=LTE, 1=WCDMA, 2=CDMA 1X, ETC.... |
| SYSTEM TIME (UNIVERSAL TIME) RANGE – USED TO GET COMBINED DATA FOR SPECIFIC TIME RANGE | |
| DAY OF WEEK | |
| LATITUDE | |
| LONGITUDE | |
| RADIUS. USED TO GET COMBINED DATA FROM AREA AROUND YOUR LAT AND LONG | |
| TIMESTAMP – UTC TIME | |

(1 TO QUERY COUNT)

APPARATUS AND METHOD FOR CLOUD ASSISTED WIRELESS MOBILITY

TECHNICAL FIELD

The present disclosure is related generally to wireless communications and, more specifically, to cell handover and/or cell selection methods.

BACKGROUND

The performance of wireless mobile computing devices is affected by the capabilities of the underlying network technologies. To provide voice and data communication capabilities, cellular wireless communication systems are widely deployed, which use a variety of radio access technologies (RATs). Such systems may be multiple-access systems able to support communication with multiple users by sharing system resources such as bandwidth, frequency, and transmission power. Commonly used multiple-access systems include, but are not limited to, Code-Division Multiple Access (CDMA) systems, Time-Division Multiple Access (TDMA) systems, Frequency-Division Multiple Access (FDMA) systems, Orthogonal Frequency-Division Multiple Access (OFDMA) systems, and the like. These communication systems, sometimes standardized by organizations such as the $3^{rd}$ Generation Partnership Project (3GPP) or the Institute of Electrical and Electronics Engineers (IEEE), may allow for voice communications and, additionally or alternately, may provide for the exchange of packet data, such as to, for example, access the Internet.

To provide broad geographic coverage, these communication systems typically include multiple base stations, where each base station may provide communication services to one or more areas, where each area is served by one or more base station cells. A serving base station cell provides wireless communication links to wireless communication devices located within the area served by that cell. As is often the case, a wireless mobile computing device will move from one location that may be served by one or more cells, to another location that may be served by one or more different cells. As the wireless mobile computing device moves further and further away from the current serving cell and towards other cells, a handoff may occur, such that the wireless mobile computing device will stop being served by the current cell, and begin to be served by another cell.

Difficulties arise, however, when a wireless mobile computing device undergoes a handoff procedure. For example, the device may execute a handoff procedure from a serving cell to a new cell as the signal strength of a serving cell becomes weaker while the signal strength of the new cell becomes stronger. The new cell, however, may not be the best option for the device. For example, there may be other cells in the area with a signal that may better serve the device, or although the new cell may have a strong signal, there may be many devices served by that cell that may cause a drop in throughput, or radio frequency (RF) interference issues caused by, for example, devices being located near each other and uploading or downloading content at similar times.

Additionally, executing a handoff procedure is a complicated and time-consuming process for a wireless mobile device, which may cause voice and data connections to be delayed or interrupted. Given these considerations, a user with a wireless mobile device (e.g. user equipment (UE)) may be moving along a route such that after a handoff from a first cell to a second cell, the second cell may serve that device only for a short amount of time, requiring the device to perform a second handoff procedure to a third cell as it moves away from the second cell's coverage area. Instead, the device may have been better off forsaking the handoff to the second cell, and instead undergoing a handoff procedure directly to a third cell that may cover more of the route's area even though the third cell may have a weaker signal than the second cell at the time and place of the handoff. Some existing solutions may provide for the use of signal-to-noise ratios and received signal levels to create an ordered list of serving cells that a UE may use as a priority list to determine best available cells for use at the UE's current location and time. These solutions, however, are limited in various ways. For example, these solutions do not take account of additional parameters that may indicate a quality of service on a particular cell. As an example, although a cell may have good signal strength, the cell may nonetheless exhibit poor data throughput rates, making the cell a poor serving cell candidate. Moreover, these solutions provide this information for use by a UE at a current time and place. Thus, there are opportunities for improved systems and methods for determining UE handoff decisions, for example, from a current serving cell to a future serving cell.

BRIEF DESCRIPTION OF THE DRAWINGS

The disclosure will be more readily understood in view of the following description when accompanied by the below figures and wherein like reference numerals represent like elements, wherein:

FIG. 9 is an illustration of an example UE cell query message containing up to a query count of cell queries in the message.

DETAILED DESCRIPTION

Figure 1:
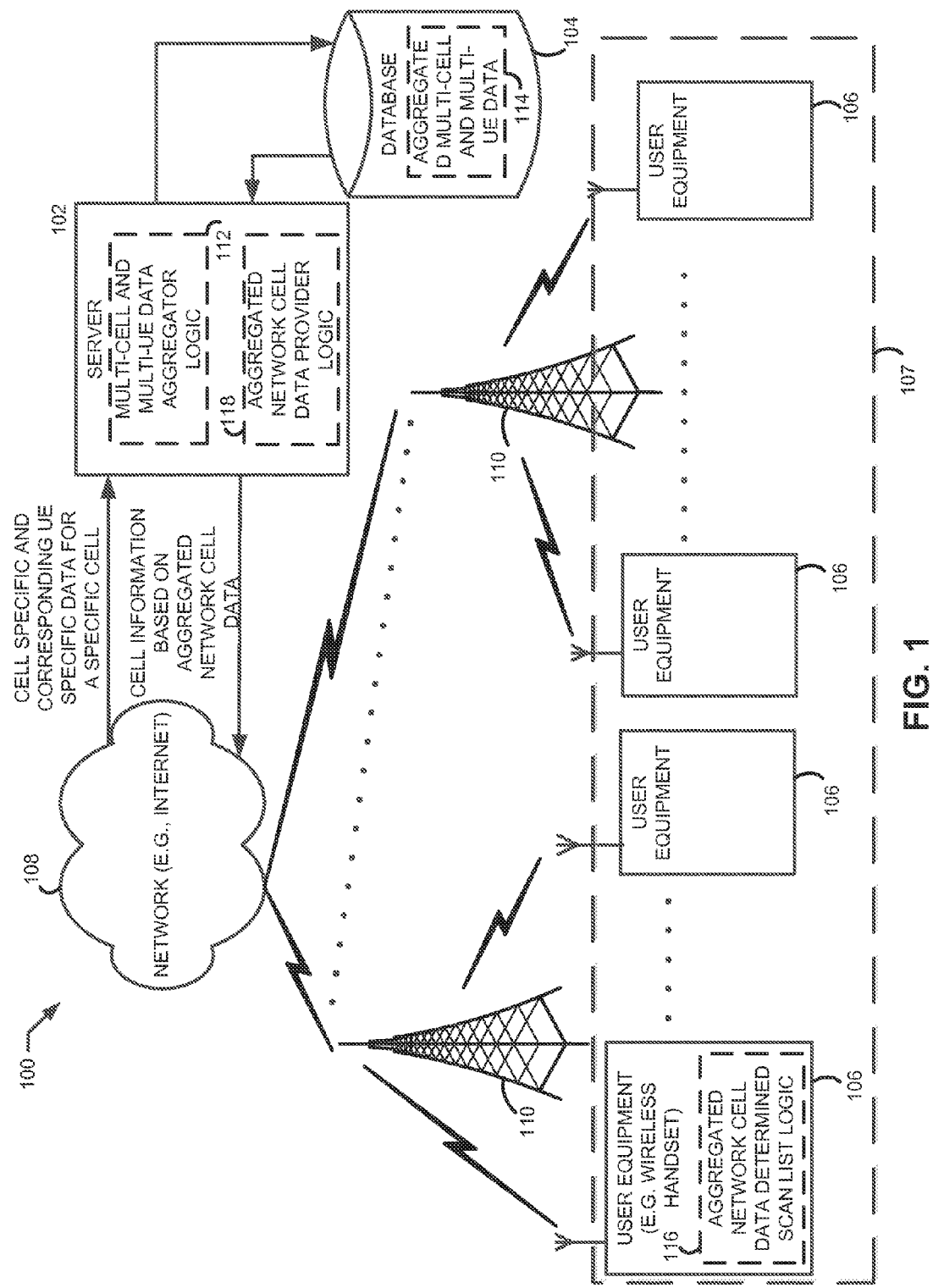
FIG. 1 is a functional block diagram illustrating an example system that includes a server employing multi-cell and multi-UE data aggregator logic and aggregated network cell data provider logic that provides cell information based on aggregated network cell data, and multiple UEs that employ aggregated network cell data determined scan list logic.

Briefly, the present disclosure is directed to methods and apparatus that take advantage of aggregated cell-related information for deciding and biasing cell handoff and cell selection determinations.

In one embodiment, a method and apparatus for providing wireless access to a radio access network for a user equipment (UE) obtains (e.g. receives), at a server, a plurality of UE upload cell messages from a plurality UEs served by different cells. The server may include, for example, one or more processors that are operative to receive data from, or provide data to, other devices. Each UE upload cell message may include cell specific data and corresponding UE specific data for a specific cell. Cell specific data may include, for example, cell identification data (e.g. a cell ID such as PSC if the RAT is WCDMA, or Pilot PN if the RAT is CDMA 1×), or a cell neighbor list. Corresponding UE specific data may include, for example, observed signal to noise ratios, maximum transmit power estimations, packet round trip time observations, and throughput measurements, to name a few. In an alternate embodiment, a UE upload message may include a scan list or a roaming list. In one example, the UE upload message with a scan list or roaming list is sent to the server by a UE for modification and, subsequently, for transmission back to the UE for use in that UE's normal operation.

The method and apparatus aggregate, at a server, network cell data based at least on the cell specific data and the corresponding UE specific data. For example, the method and apparatus may aggregate the cell specific data and the corresponding UE specific data for each serving cell, such that the observances by the UEs are grouped together by serving cell. The method and apparatus may also provide (e.g. transmit) cell information to a UE that is based at least on the aggregated network cell data. The cell information may be provided for a potentially future serving cell. In one example, the cell information is provided for a potentially future serving cell based on historical data that the server may maintain or have access to. For example, the server may maintain a history of data indicating a UE's previous locations as well as data indicating when the UE visited those locations. Based on this information, the server may predict that the UE will visit that same location on the same day-of-the-week and at the same time as indicated by the historical data. In this fashion, the server may provide cell information for a cell that serves that same location. These operations may be carried out, for example, by a cloud-based server capable of aggregating cell-based data. Other network elements, however, may carry out these operations, as will be recognized by a person of ordinary skill in the art.

In one embodiment, as part of providing cell specific information, the method and apparatus may also determine a recommended cell by re-ordering a scan list to elevate the position of a recommended cell, re-ordering a cell roaming list to elevate the position of the recommended cell, or biasing a cell measurement of the recommended cell. For example, by analyzing the aggregated network cell data corresponding to one or more serving or potential serving cells, a determination may be made as to which cell would best serve a UE. In analyzing the aggregated network cell data for one or more cells to determine a recommended cell, signal to noise ratios, throughput times, observed cell transmit powers, and average packet round trip time observations may be compared, for example. The recommend cell may then be elevated in a cell roaming list, such that the recommend cell will have a higher priority in the cell roaming list than before the cell was recommended. Additionally or alternatively, a cell measurement of the recommend cell may be biased in either a positive or negative manner. For example, by positively biasing a cell measurement of the recommended cell, the recommended cell may become preferred or more-preferred over other available cells, and may be incorporated, or more quickly incorporated, into an active set of cells. For example, the recommended cell may be moved up in a priority list, whereby the UE attempts to attach to cells in priority order (e.g. from highest in list to lowest in list). In one embodiment, the recommended cell is based at least on determining a number of users on a wireless cell and determining available bandwidth of the wireless cell.

In one embodiment, as part of providing cell specific information, the method and apparatus may also determine a recommended RAT for re-ordering a scan list to elevate the position of the recommended cell, re-ordering a RAT roaming list to elevate the position of the recommended RAT, or biasing a cell measurement of the recommended RAT. For example, by analyzing the aggregated network cell data corresponding to one or more serving or potentially serving cells, a determination may be made as to which RAT would best serve a UE. The recommend RAT may then be elevated in a RAT roaming list, such that the recommended RAT will have a higher priority in the RAT roaming list than before the RAT was recommended. Additionally or alternatively, a cell measurement of the recommend RAT may be biased in either a positive or negative manner, such that the RAT may become more or less preferred over other RATs.

In one embodiment, the method and apparatus provide the cell information in response to obtaining (e.g. receiving) a cell query message from a UE. For example, a UE may be experiencing delayed or interrupted voice or data connections on its serving cell. To determine service options on neighboring cells, the UE may be provided with cell information related to those other cells by requesting the information via the cell query message. The cell query message may contain cell query data including, for example, a query count representing the number of cell queries that are contained in the message. For each cell query, the cell query message may contain, for example, a timestamp range, such that the provided cell information is based on aggregated data within that timestamp range. Similarly, the cell query message may contain, for each cell query, location information such as latitude, longitude, and radius information, such that the provided cell information is based on aggregated data obtain with the specified radius of the provided latitude and longitude. The location information provided may be based on a future location or time, such as a future location the UE may later visit.

In one embodiment, a method and apparatus for providing wireless access to a radio access network for user equipment, establishes, at a UE, a network connection (e.g. wireless network connection) to, for example, an internetworked server, and receives a cell information response message from, for example, the internetworked server that includes cell information based at least on aggregated network cell data. For example, after powering up, a UE may connect to the first available network, thus establishing a network connection. The UE may then receive cell information for one or more cells that is based on aggregated network data, such that the UE can analyze the connectivity observed by UEs that are, or have been, serviced by those cells. The UE may use the received cell information to determine (e.g. create or re-order) a scan list, biasing one or more cells in the list according to the received cell information. For example, a UE may maintain a preferred roaming list, a type of scan list that, during the system determination process (e.g., during power-up or after system loss), the UE may access to determine available networks and cells. If the UE receives cell information indicating that a particular cell is performing well, the UE may re-order the cell roaming list by either placing that cell on the preferred roaming list if the cell is not already on the list, or the UE may assign the cell a higher priority on the list, where the UE will attempt to connect to a cell with a higher priority on the list before it attempts to connect to others with a lesser priority. In one example, they UE may transmit cell measurement data based on the determined scan list. For example, the UE may transmit cell measurement data to a base station to bias a preferred cell.

In one example, the UE may compare cell loading information, received as part of the received cell information, to thresholds that the UE maintains. The cell loading information may include cell signal strength and quality metrics, for example. If a received metric meets or exceeds its corresponding threshold, the UE may then proceed with re-ordering a scan list, as described above. Otherwise, the UE may decide not to re-order the scan list, because a metric did not meet its corresponding threshold.

As another example, a UE may maintain a neighbor list, another type of scan list, that contains information on neighboring cells. For example, a UE may receive a scan list from a base station, where the neighbor list contains a list of neighboring cells that the UE may monitor as potential handoff candidates. The neighbor list may also contain thresholds of energy and signal quality that the neighboring cells must exceed before the UE should report measurement data back to the base station, for example, via measurement reports. If the UE reports a cell or cells that exceed the thresholds, the base station may make a handoff decision and instruct the UE to handoff to another cell. For example, as a UE moves away from a serving cell and closer to a neighboring cell, the UE may report to the base station that the signal strength of the neighboring cell is stronger than the required threshold. The base station may then instruct the UE to join that neighboring cell, and after the UE joins that cell, the base station may send another neighbor list that contains the neighboring cells to the new serving cell, along with a set of thresholds for those neighboring cells. If the UE receives cell information indicating that a particular cell is performing well, the UE may place that cell on the neighbor list if the cell is not already on the list, or additionally or alternatively, the UE may bias the cell, such that a measurement of that particular cell is positively adjusted. For example, although the UE may be measuring a signal strength level of a neighboring cell to be at one level, if received cell information indicates that the same neighboring cell is performing well, the UE may bias the measurement by artificially increasing the signal strength level from the level measured. The UE may then report the artificially increased signal strength for the neighboring cell to its serving base station in an effort to have the base station instruct the UE to handoff to that neighboring cell.

The method and apparatus may also, at a UE, provide UE upload cell messages to a server, where each UE upload cell message may include cell specific data and corresponding UE specific data for a specific cell, as described above. In one embodiment, the corresponding UE specific data includes cell signal strength data, cell interference data, and roundtrip time (RTT) data. In one embodiment, cell specific data includes RAT data and cell identifier data. In one embodiment, the UE provides a plurality UE upload messages during idle mode, for example, during idle mode scans. The term "idle mode" refers to a time when the UE is not actively transmitting to or receiving information from a base station. During an idle mode scan, the UE may passively measure signal strength and quality and may also listen for messages from the base station. The UE upload messages may then be transmitted to the server during an idle mode when a data communications network is available. Additionally or alternatively, a UE, may connect to data communications networks via a different RAT network such as a WLAN. Example WLAN networks include, but are not limited to, Wi-Fi networks, home WLANs, WLAN hotspots, public WLANs, private WLANs, and the like. The UE may then provide the UE upload cell messages to the server via the different RAT network. For example, the UE may connect to a RAT such as LTE for voice and data communications, but may provide UE upload cell messages only when connected to a Wi-Fi network. Thus, the UE may connect to a Wi-Fi network, either while connected to or after disconnecting from, the LTE network, to provide the UE upload cell messages.

For example, the UE may provide UE upload cell messages when convenient, such as when the UE connects to a Wi-Fi network or when the UE has a suitable radio frequency (RF) connection. Moreover, the UE may provide UE upload messages to a server with respect to cells the UE is currently or recently been serviced by. Because multiple UEs are served by any one given cell, each UE upload message adds to the collective knowledge for that given cell. UEs may upload cell data several times for any given cell, and may upload cell data for a multiple of serving cells as the UE moves from one serving cell to another.

In one embodiment, the method and apparatus, at the UE, may transmit a cell query message that includes cell query data, so as to request cell information from a server. For example, the UE may transmit a cell query message to a server, and in response, the server may reply with a cell information response message, as described above. In one example, the UE may provide a cell query message that includes a Mobile Country Code (MCC), a Mobile Network Code (MNC), a RAT, a "Physical Cell Identity (PCI)" or cell ID, and day of week data that indicates for which day of the week the UE is requesting cell data for. In another example, the UE may provide a cell query message that includes a day of week, time, and physical location (e.g. latitude and longitude data) for a location the UE will visit at a future time. The response from the base station may include, for example, cell recommendation data or scan or roaming list data that the UE maintains for future use (e.g. when the UE visits that location).

In one example, a UE transmits a cell query message to query a server for cells likely to be encountered on a future route. For example, a UE may detect that its user is traveling along a pre-defined route (e.g. a user enters a destination into a navigation application running on the UE). The UE may then query the server for cell information for cells along that predefined route. The UE may then give one or more of the queried cells preferential treatment (e.g. UE may bias the cell) in the handoff process (e.g. when sending measurement reports on a cell to a base station) so as to maximize network service quality as the UE moves from one served area to the next. In another example, the UE may query the server for cell information for cells serving a future location the UE will potentially visit based on a calendar event. For example, if a calendar event, such as a calendar application running on the UE, indicates a user of the UE is scheduled to be at a particular place at a particular time, the UE may request from the server cell information for cells that provide coverage for that particular place and time. As another example, the UE may query the server for cell information for a potentially future serving cell based on a search result, such as a web-based search result. For example, if a user of the UE searches for a location using a mapping application or any other suitable application, the UE may request cell information for future serving cells along a path from where the UE is currently situated, and the searched location. It is to be appreciated that there are many such forms of predicting future locations of a UE and these examples are not meant to be limiting.

Turning to the drawings, FIG. 1 shows a system 100 including a cloud-based server 102 that aggregates network cell data and provides cell information to one or more user equipment 106 that may be part of a plurality of UEs 107 as described in further detail below. Server 102 includes multi-cell and multi-UE data aggregator logic 112 that is configured to obtain cell specific and corresponding UE specific data for a specific cell from numerous base stations 110 via network 108, parse and analyze the obtained data, and provide the resultant data to database 104 to be stored as aggregated multi-cell and multi-UE data 114. Server 102 may also provide cell information, such as cell information for a cell that may serve a UE in the future, to base station 110 via network 108 that may be based on aggregated network cell data derived from the aggregated multi-cell and multi-UE data 114 stored in database 104.

Figure 2:
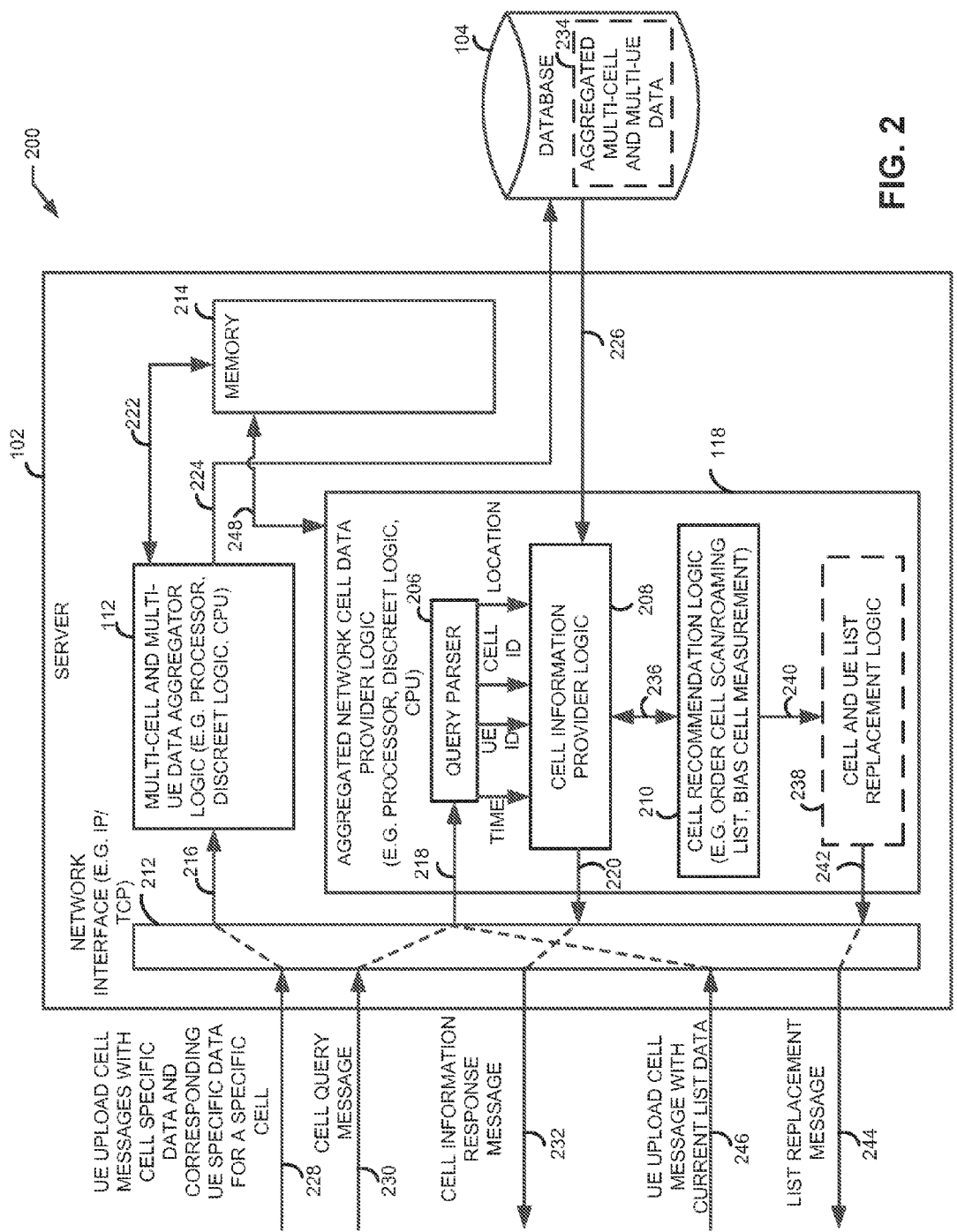
FIG. 2 is a more detailed functional block diagram of the example server 102 in FIG. 1 including multi-cell and multi-UE data aggregator logic and providing further detail of the aggregated network cell data provider logic.
Figure 3:
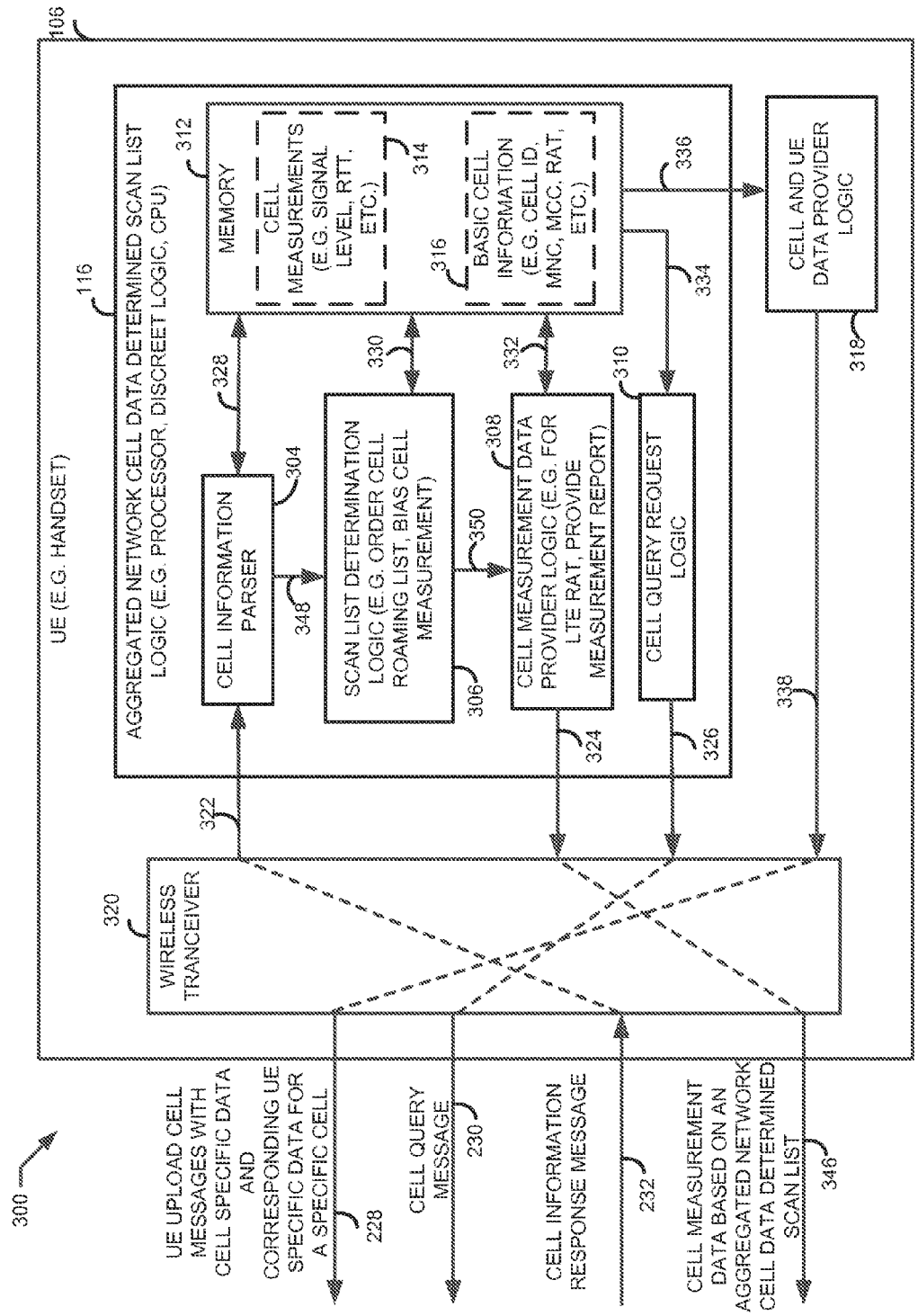
FIG. 3 is a more detailed functional block diagram of the example UE 106 in FIG. 1 providing further detail of aggregated network cell data determined scan list logic and including cell and UE data provider logic.

FIG. 2 and its accompanying text will describe in more detail the functionality of server 102 and database 104. Network 108 may be any communication network including any TCP/IP based network, wireless network operating over any RAT, wired network, or any other network as may be appreciated by one of ordinary skill in the art. System 100 also includes one or more base stations 110 that also communicate with network 108. Each base station is also capable of communicating with one or more UEs 106 over a radio access network. For example, base stations 110 may provide wireless communication services to a plurality of UEs 107 such as UEs 106 by providing wireless access over one or more cells utilizing one or more RATs. Thus the UEs may transmit information to, and receive information from, base stations 110. These communications may include, for example, data and voice communications. Each UE 106 may include aggregated network cell data determined scan list logic 116 that may obtain cell information from, for example, server 102, based on aggregated network cell data, determine a scan list, and provide cell measurement data to a base station. FIG. 3 and its accompanying text will describe in more detail the functionality of UEs 106.

FIG. 2 is a functional block diagram 200 providing more details of server 102 and database 104. As indicated in the figure, server 102 includes multi-cell and multi-UE data aggregator logic 112, aggregated network cell data provider logic 118, network interface 212, and memory 214. Memory 214 may be any suitable memory, such as on-chip memory, RAM, or SRAM. In some embodiments, some or all of the functions of server 102 may be performed by any suitable processor or processors, or by any other suitable logic such as discreet logic, Digital Signal Processors (DSPs), Field Programmable Gate Arrays (FPGAs), or Application Specific Integrated Circuits (ASICs). As indicated in the figure, multi-cell and multi-UE data aggregator logic 112 is operatively coupled at least to network interface 212, memory 214, and to database 104, while aggregated network cell data provider logic 118 is operatively coupled at least to network interface 212, memory 214, and database 104. Network interface 212 may be operatively coupled to one or more networks, such as an internet based network.

Multi-cell and multi-UE data aggregator logic 112 obtains a plurality of UE upload cell messages with cell specific data and corresponding UE specific data for a specific cell 228 from a plurality of UEs that may be served by different cells, where each UE upload cell message includes cell specific data and corresponding UE specific data for that specific cell. The UE upload cell messages 228 are received by network interface 212 and obtained by multi-cell and multi-UE data aggregator logic 112 over communication link 216. In addition, multi-cell and multi-UE data aggregator logic 112 aggregates network cell data based at least on the obtained UE upload messages with cell specific data and corresponding UE specific data for a specific cell 228, and stores aggregated multi-cell and multi-UE data 234 in database 104 over communication link 224. Additionally, multi-cell and multi-UE data aggregator logic 112 may access memory 214 over communication link 222 and may temporarily store all or parts of obtained UE upload cell messages with cell specific data and corresponding UE specific data for a specific cell 228 in memory 214. In this fashion, multi-cell and multi-UE data aggregator logic 112 may format received data from UE upload cell messages 228 for storage into database 104 to be stored as aggregated multi-cell and multi-UE data 234. For example, multi-cell and multi-UE data aggregator logic 112 may store obtained data in memory 214 until a threshold of data has been obtained for a specific cell. After a threshold of data has been obtained for a specific cell, multi-cell and multi-UE data aggregator logic 112 may format the data and provide it to database 104 for storage as aggregated multi-cell and multi-UE data 234.

Aggregated network cell data provider logic 118 may include a query parser 206, cell information provider logic 208, cell recommendation logic 210, and cell and UE list replacement logic 238. Network interface 212 may receive cell query messages 230 and provide them to query parser 206 over communication link 218. Query parser 206 may parse the obtained cell query messages 230 and provide information from the messages to cell information provider logic 208. As one example, and as indicated in the figure, query parser 206 may provide a UE ID, a CELL ID, location data, and time data to cell information provider logic 208 for every obtained cell query message 230. Cell information provider logic 208 provides a cell information response message 232, that may be based on aggregated multi-cell and multi-UE data 234, to network interface 212 over communication link 220 for transmission to a UE. For example, cell information provider logic 208 may provide cell information to a UE based on the aggregated multi-cell and multi-UE data 234 stored in database 104 by accessing database 104 over communication link 226. Cell information provider logic 208 also has access to memory 214 over communication link 248 which may store UE upload cell messages with cell specific data and corresponding UE specific data for a specific cell 228. In this fashion, cell information provider logic 208 has access to cell and UE specific data in memory 214 that may not yet be available in database 104, as described above.

Cell information provider logic 208 may also provide a cell recommendation. For example, the cell information that cell information provider logic 208 provides to a UE may include a cell recommendation so as to allow the UE to re-order its scan list with the recommended cell. To provide a cell recommendation, cell information provider logic 208 is operatively coupled to cell recommendation logic 210. For example, as indicated in FIG. 2, cell information provider logic 208 and cell recommendation logic 210 may communicate over communication link 236 which allows bilateral communications. If providing a recommended cell, cell information provider logic 208 provides cell recommendation logic 210 with UE ID, CELL ID, location data, and time date, as well as access to aggregated multi-cell and multi-UE data 234, over communication link 236 to determine the cell recommendation. Cell recommendation logic 210 may recommend a cell for re-ordering a scan list to elevate the position of a recommended cell, re-ordering a cell roaming list to elevate the position of a recommended cell, or for biasing a cell measurement of the recommended cell. Additionally or alternatively, cell recommendation logic 210 may maintain cell roaming lists and measurement reports for one or more UEs, such that the provided cell recommendation includes a cell scanning list, a cell roaming list, or measurement report, in part or whole. Cell recommendation logic 210 provides the recommended cell to cell information provider logic 208 over communication link 236 to be included in the cell information response message 232.

In one embodiment, network interface 212 may receive one or more UE upload cell messages with list data 246 whereby each such received message is provided to query parser 206 over communication link 218. Each UE upload cell message with list data 246 may contain, for example, one or more scan list or roaming list. The list data may be associated with a current location of the UE. The list data may also be associated with a location to be visited by the UE at a future time. For example, UE a upload cell message with list data 246 may include a scan list for a current location of the UE, and a roaming list for a location determined to be on a future route of the UE. Similar to as described above with respect to obtained cell query messages 230, query parser 206 may parse the UE upload cell messages with list data 246 and provide information from the messages to cell information provider logic 208. Cell information provider logic 208 may determine if a list replacement is to be provided, and if so, may provide cell recommendation logic 210 with UE ID, CELL ID, location data, and time data, as well as access to aggregated multi-cell and multi-UE data 234 over communication link 236 to determine a replacement list. For example, cell information provider logic 208 may determine that a received list via a UE upload cell message with list data 246 should be re-ordered because the received cell list order does not reflect better performing cells at the time and location specified. If a received list is to be re-ordered, cell recommendation logic 210 re-orders the received list to create a replacement list, and provides the replacement list to cell and UE list replacement logic 238 over communication link 240. Cell and UE list replacement logic 238 subsequently formats the list into a list replacement message 244, and provides network interface 212 with the message over communication link 242 for transmission to a UE.

FIG. 3 provides a functional block diagram 300 providing more details of UE 106. UE 106 may be any wireless mobile computing device that performs handovers, for example, such as, but not limited to, a handset, tablet, a mobile or smart phone, a phablet, a laptop computer, a satellite phone, or any other suitable device including any suitable battery-equipped device, for example. As indicated in the figure, UE 106 may include aggregated network cell data determined scan list logic 116, cell and UE data provider logic 318, and wireless transceiver 320. In some embodiments, some or all of the functions of UE 106 may be performed by any suitable processor or processors, or by any other suitable logic such as discreet logic, DSPs, FPGAs, or ASICs. As indicated in the figure, aggregated network cell data determined scan list logic 116 includes cell information parser 304, scan list determination logic 306, cell measurement data provider logic 308, cell query request logic 310, and memory 312. Memory 312 may be any suitable memory, such as on-chip memory, RAM, or SRAM.

Wireless transceiver 320 is configured to connect to one or more networks operating over one or more RATs, such as LTE, LTE Advanced, WiMAX, or WLAN. Wireless transceiver 320 may receive from, for example, server 102, the cell information response message 232, and if received provides it to cell information parser 304 over communication link 322. Cell information parser 304 may parse fields of the received cell information to identify cell measurement data, basic cell information data, or both, and store parts or all of it in memory 312 by accessing memory 312 over communication link 328. Cell information parser 304 may also provide all or parts of the parsed or received cell information to scan list determination logic 306 over communication link 348, whereby scan list determination logic 306 may then determine a scan list based at least on the received cell information. Scan list determination logic 306 may also access memory 312 over communication link 330, and thus may access cell information stored in memory 312 to determine a scan list.

Scan list determination logic 306 may determine a scan list, for example, by re-ordering a scan list to elevate the position of a preferred wireless cell, re-ordering a cell roaming list to elevate the position of a preferred wireless cell, or by biasing a cell measurement of a preferred wireless cell, as described above. For example, scan list determination logic 306 may order a roaming list, stored in memory 312, by giving a cell a higher priority in the roaming list when it receives cell information response message 232 indicating that service on the cell is much better than on other available cells. In one example, scan list recommendation logic 306 may also compare cell loading information, received as part of the received cell information, to thresholds that may be maintained in memory 312. The cell loading information may include cell signal strength and quality metrics, for example. If a received metric exceeds its corresponding threshold, scan list recommendation logic 306 may then proceed with re-ordering a current scan list, as described above. Otherwise, scan list recommendation logic 306 may not re-order the current scan list.

Additionally, cell measurement data provider logic 308 may provide cell measurement data based on an aggregated network cell data determined scan list 346 to, for example, a base station. For example, scan list determination logic 306 may bias a cell measurement for a specific cell and store that biased value in memory 312. Subsequently, cell measurement data provider logic 308 may access memory 312 over communication link 332 to provide a measurement report to a base station that includes the biased value for the specific cell. Alternatively, scan list determination logic 306 may provide a determined scan list, or parts thereof, directly to cell measurement data provider logic 308 over communication link 350. In addition, cell measurement data provider logic 308 may store measurement data, including, for example, a measurement report, in memory 312. Cell measurement data provider logic 308 provides the cell measurement data based on an aggregated network cell data determined scan list 346 to the wireless transceiver 320 over communication link 324 for transmission to, for example, a base station.

Aggregated network cell data determined scan list logic 116 may also include cell query request logic 310, which may provide a cell query message 230 to wireless transceiver 320 for transmission. As described above, the cell query message may contain a request to a server, such as server 102, to provide cell information response message 232 for one or more specific cells. For example, cell query request logic 310 may provide a cell query message 230 for all cells within a neighbor list that may be stored in memory 312. Cell query request logic 310 may access memory 312 over communication link 334 to obtain the required cell identification data for each of the requested cells in the cell query message 230. Cell query request logic 310 then provides the cell query message 230 to the wireless transceiver 320 over communication link 326 for transmission to a server such as server 102.

Aggregated network cell data determined scan list logic 116 may also obtain and store in memory 312 observed cell measurements 314 and basic cell information 316. For example, while UE 106 is connected to a serving cell, aggregated network cell data determined scan list logic 116 may store in memory 312 observed cell measurements 314 and basic cell information 316 for that serving cell. As UE 106 is served by other cells, for example, after a handoff process or system determination process, aggregated network cell data determined scan list logic 116 may store observed cell measurements 314 and basic cell information 316 for those serving cells as well. This data may be accessed by cell and UE data provider logic 318, over communication link 336, to provide UE upload cell messages with cell specific data and corresponding UE specific data for a specific cell 228 to, for example, server 102. Cell and UE data provider logic 318 provides the UE upload cell messages 228 to wireless transceiver 320 over communication link 338 for transmission to server 102.

Figure 4:
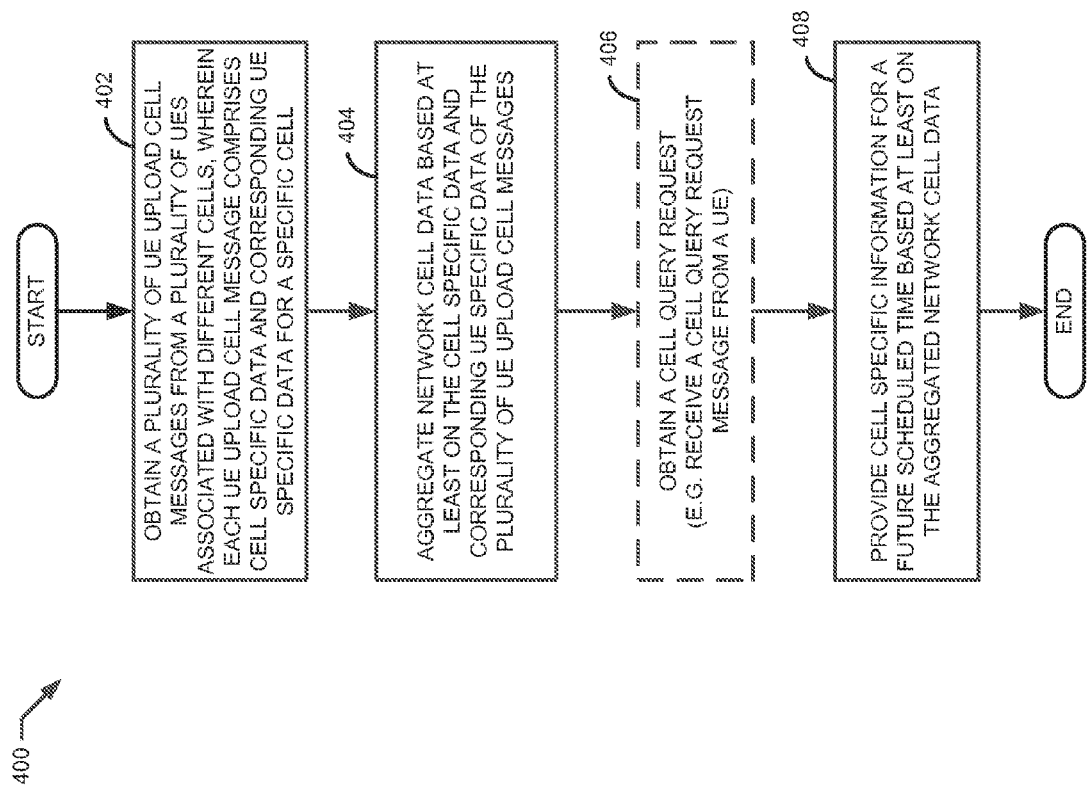
FIG. 4 is a flowchart of an example method for aggregating network cell data and providing cell specific information for a future scheduled time based on the aggregated network cell data.

FIG. 4 is a flowchart 400 of an example method at a server, for example, such as server 102, that aggregates network cell data and provides cell information based at least on the aggregated network cell data. The method illustrated in FIG. 4, and each of the example methods described herein, may be carried out by one or more suitably programmed controllers or processors executing software. The method may also be embodied in hardware or a combination of hardware and hardware executing software. Suitable hardware may include one or more processors, discreet logic, ASICs, FPGAs, and/or other suitable hardware. Although the methods are described with reference to the illustrated flowcharts (e.g., in FIG. 4), it will be appreciated that many other ways of performing the acts associated with the method(s) may be used. For example, the order of some operations may be changed, and some of the operations described may be optional. Additionally, while the methods may be described with reference to the example server 102 or UE 106, it will be appreciated that the methods may be implemented by other apparatus as well, and that the server 102 and UE 106 may implement other methods.

Method 400 includes obtaining (402) a plurality of UE upload cell messages from a plurality of UEs served by different cells, where each UE upload cell message includes cell specific data and corresponding UE specific data for that specific cell. The method further includes aggregating (404) network cell data based at least on cell specific data and corresponding UE specific data from various UEs, and providing (408) cell information to a UE based at least on the aggregated network cell data. The providing of cell information may be in response to obtaining (406) a cell query request from a UE.

Figure 5:
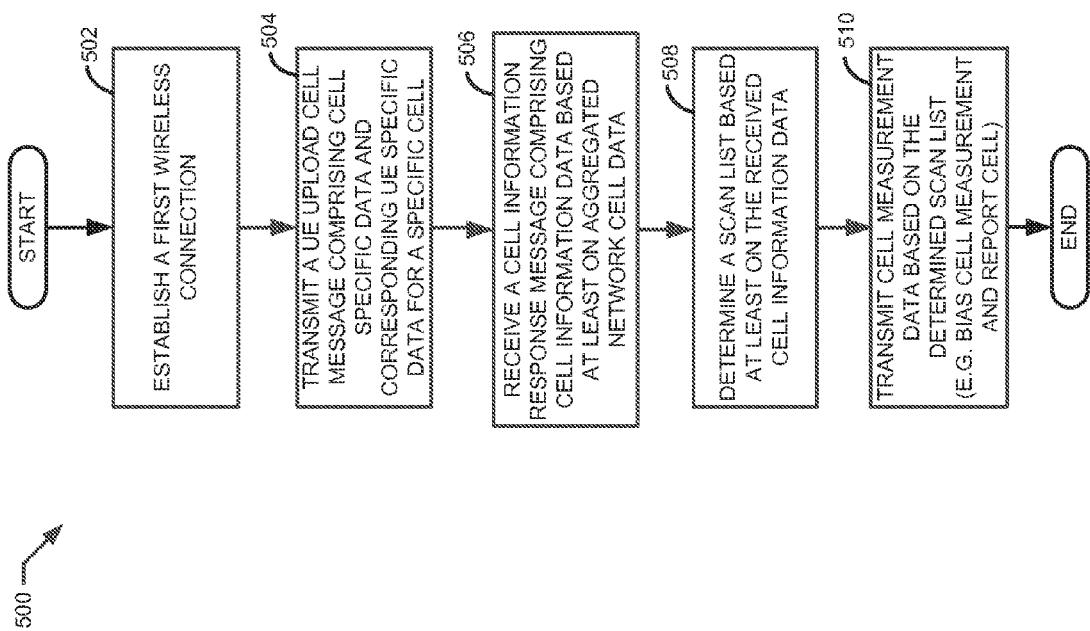
FIG. 5 is a flowchart of an example method for transmitting cell and UE specific data to, for example, a server, and for determining a scan list based on cell information data that is based on aggregated network cell data.

FIG. 5 is a flowchart 500 of an example method at a UE, for example, such as at UE 106, that determines a scan list based on received cell information. The flowchart 500 begins with establishing (502) a first wireless connection to, for example, a network via the base station, and transmitting (504) a UE upload cell message that includes cell specific data and corresponding UE specific data for a specific cell. The flowchart also includes receiving (506) a cell information response message that includes cell information data based at least on aggregated network cell data, where, for example, the aggregated network cell data is based on aggregated multi-cell and multi-UE data from a plurality of UEs. The flowchart may also include determining (508) a scan list based at least on the received cell information data (e.g. ordering a scan list to elevate the position of the recommended cell, ordering a cell roaming list, or biasing a cell measurement), and transmitting (510) a cell measurement based on the determined scan list (e.g. transmitting a measurement report to a base station).

Figure 6:
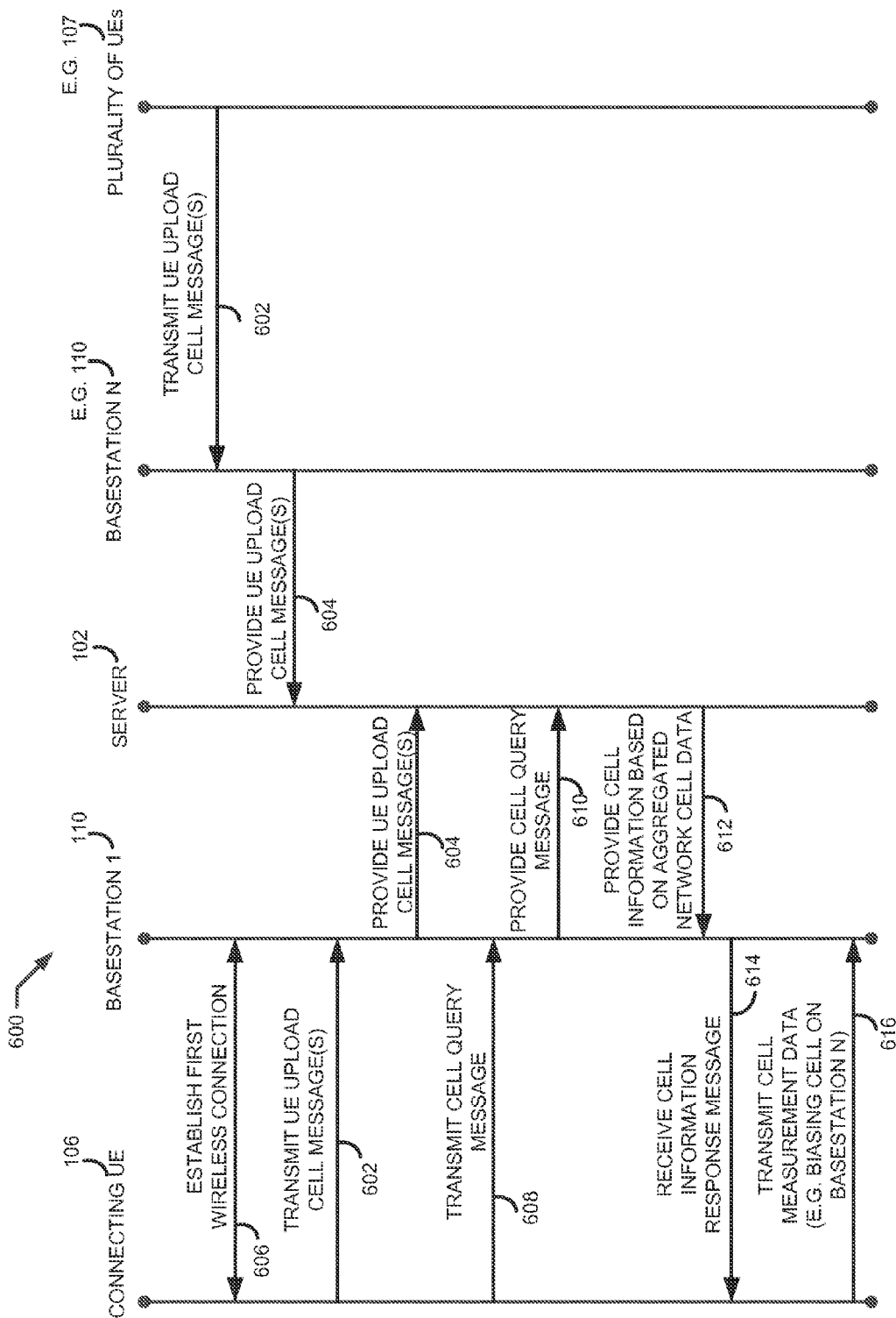
FIG. 6 is an example messaging diagram of an example system including a server, a plurality of base stations, a plurality of UEs, and a connecting UE, wherein a UE may request cell information based on aggregated data from a server.

FIG. 6 provides a messaging diagram 600 showing one example of messaging between a server (e.g. server 102), UEs (e.g. UE 106), and base stations (e.g. base station 110). Although the messaging is described with reference to the diagram illustrated in FIG. 6, it will be appreciated that many other messaging schemes may be used. For example, the order of some of the messages may be changed, and some of the messages described may be optional. Messaging diagram 600 includes upload cell messages from a plurality of UEs to base station N (602), where base station N represents any number of base stations. For example, the UE upload cell message may include cell specific data and corresponding UE specific data for a specific cell serviced by base station N. The diagram includes messaging from base station N to a server that provides the UE upload cell messages (604). Messaging diagram 600 also includes messaging between a connecting UE and base station 1 that establishes a wireless connection (606). The connecting UE may also transmit to base station 1 UE upload cell messages (602), which may then be provided to the server (604).

The diagram further includes a cell query message (608) transmitted from the connecting UE, now connected, to base station 1. For example, the cell query message may include a request for cell information based on aggregated network cell data for a cell serviced by base station N, such as the cell that may be servicing one or more of the plurality of UEs. As indicated in messaging diagram 600, base station 1 provides the cell query message to the server (610). The messaging diagram includes the server providing cell information based on aggregated network cell data to base station 1 (612), for example, in response to the cell query message. The connected UE then receives a cell information response message from base station 1 (614) that includes the cell information based on aggregated network cell data. The messaging diagram 600 also shows the now-connected UE transmitting cell measurement data to base station 1 (616). For example, assuming that the received cell information indicates that a cell on base station N is a preferable cell, the connected UE may transmit cell measurement data to base station 1 to bias the preferred cell on base station N to influence a handover to base station N rather than another base station.

Figure 7:
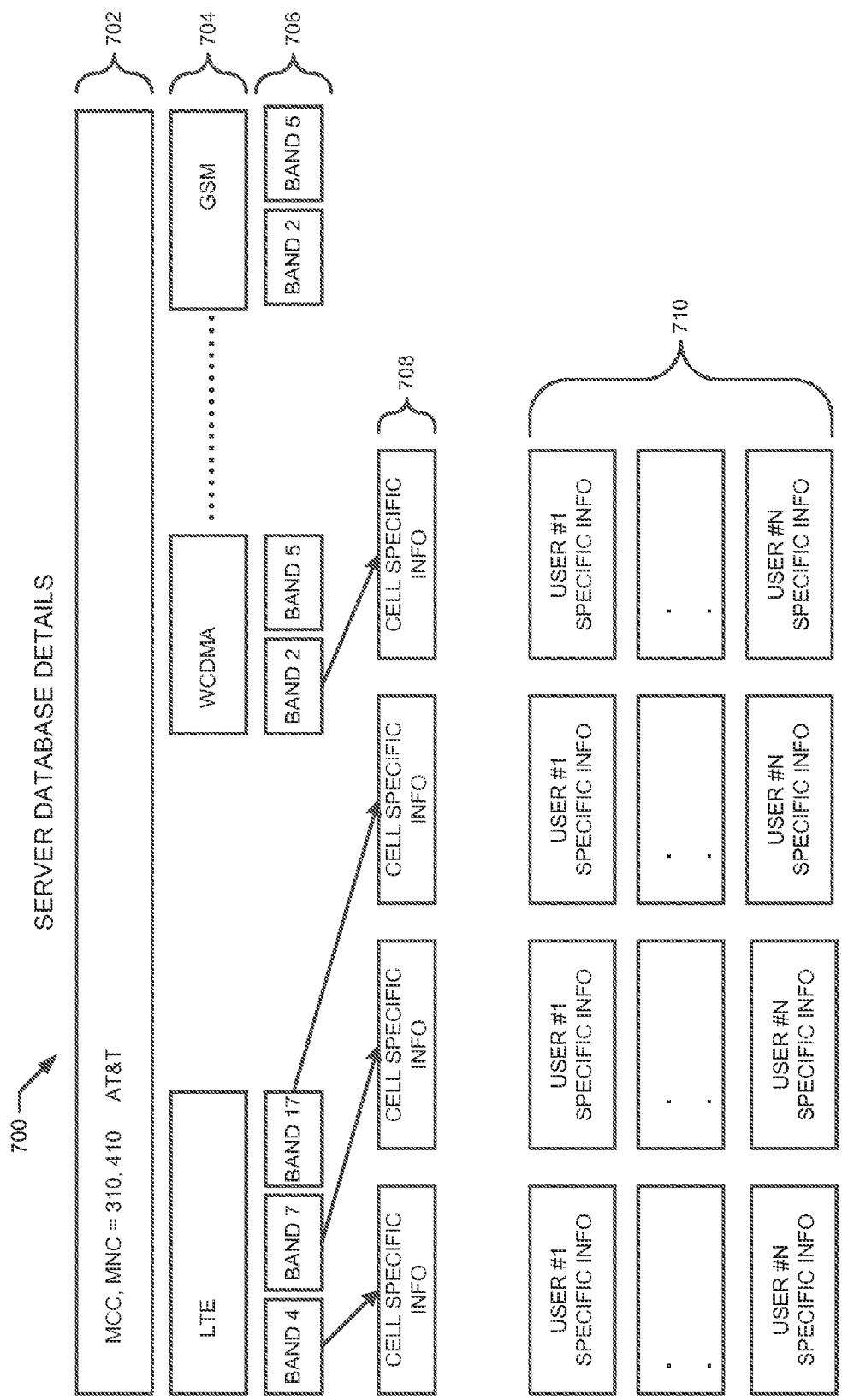
FIG. 7 is an illustration of an example server database, such as database 104 of FIG. 1, containing aggregated network cell data served by a plurality of different cells.

FIG. 7 is an example diagram 700 of aggregated network cell data in a server database, such as database 104. At the highest level, the aggregated network cell data may be organized by carrier, such as indicated the carrier type category 702. For each carrier, there may be one or more RAT type category 704, such as LTE, WCDMA, and GSM. Each RAT category may be subdivided into band categories, as indicated by the band type category 706. Each band category 706 may hold cell specific info 708 and UE specific info 710 for one or more cells.

Figure 8:
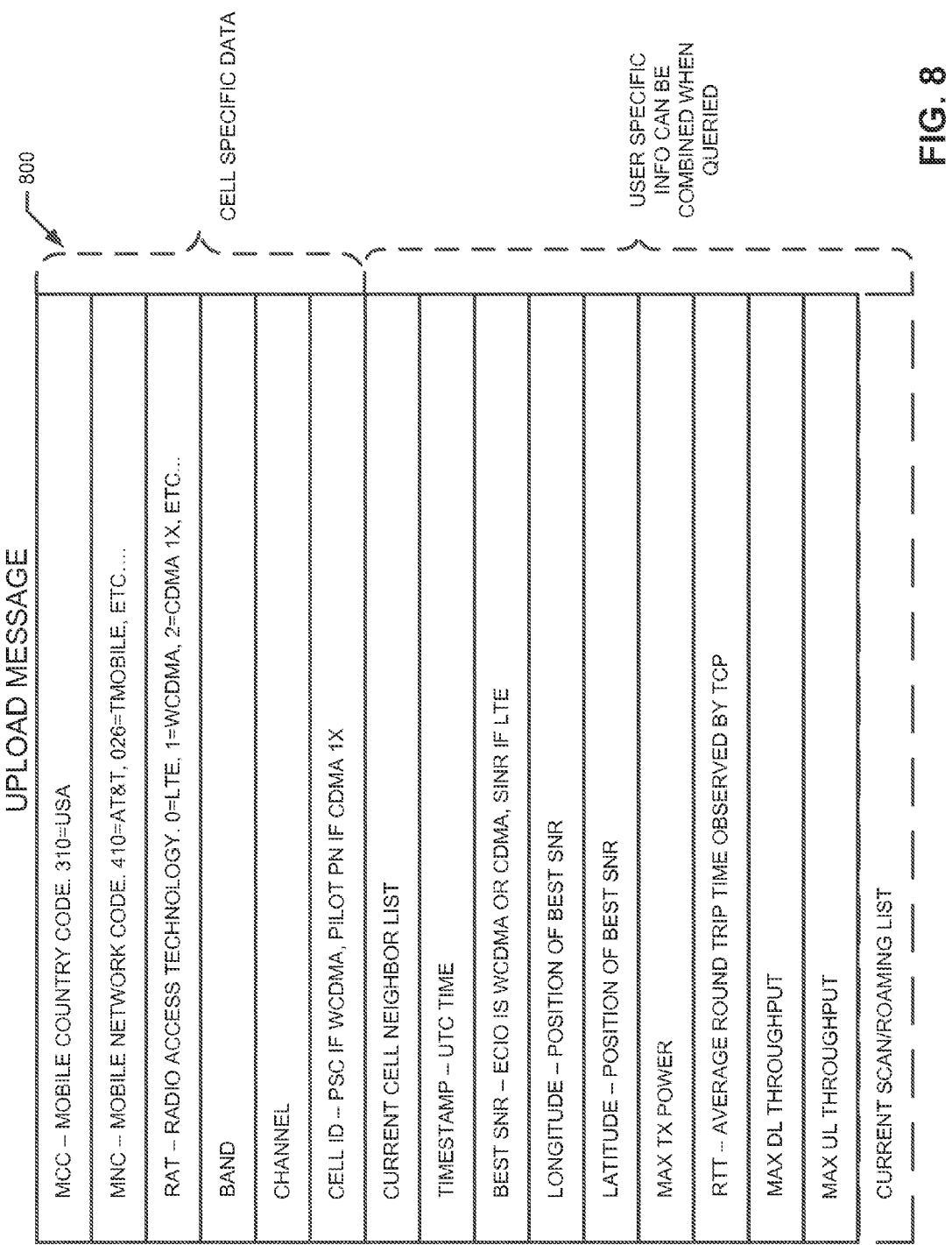
FIG. 8 is an illustration of an example UE upload message containing network information, cell specific information, and UE specific information.

FIG. 8 is an example diagram 800 of a UE upload cell message that includes cell specific data and corresponding UE specific data for that specific cell. As indicated in the diagram, cell specific data may include cell identification data. Other data, such as the mobile country code (MCC), mobile network code (MNC), RAT, band, and channel may also be included. Corresponding UE specific data may also be included, such as timestamp data indicating a time that the UE upload message is transmitted. Corresponding UE specific data may also include data corresponding to cell conditions observed by the UE and may also include a neighbor list. For example, corresponding UE specific data may include a best observed signal to noise ratio, a longitude and latitude associated with the position of the best observed signal to noise ratio, a maximum observed transmit power (e.g. from a base station), an average round trip time observed (e.g. RTT observed for a TCP protocol), and maximum downlink and uplink throughput observances. Further pertinent cell information may also be included. Additionally, one or more lists may be included such as scan lists or roaming lists. For example, a UE may include a scan list to be re-ordered by the base station, and in return receive the re-ordered scan list from the base station.

FIG. 9 is an example diagram 900 of a cell query message transmitted by a UE, such as UE 106, to request, for example, cell information based on aggregated network data from a server, such as server 102. As indicated in the diagram and described above, the cell query message may include a query count representing the number of cell queries contained in the message. The cell query message may also contain MCC data, MNC data, RAT data, a timestamp range used to request combined data from a specific time range, day of the week data, and latitude, longitude, and radius data used to request combined data from an area surrounding a specified position.

Figure 10:
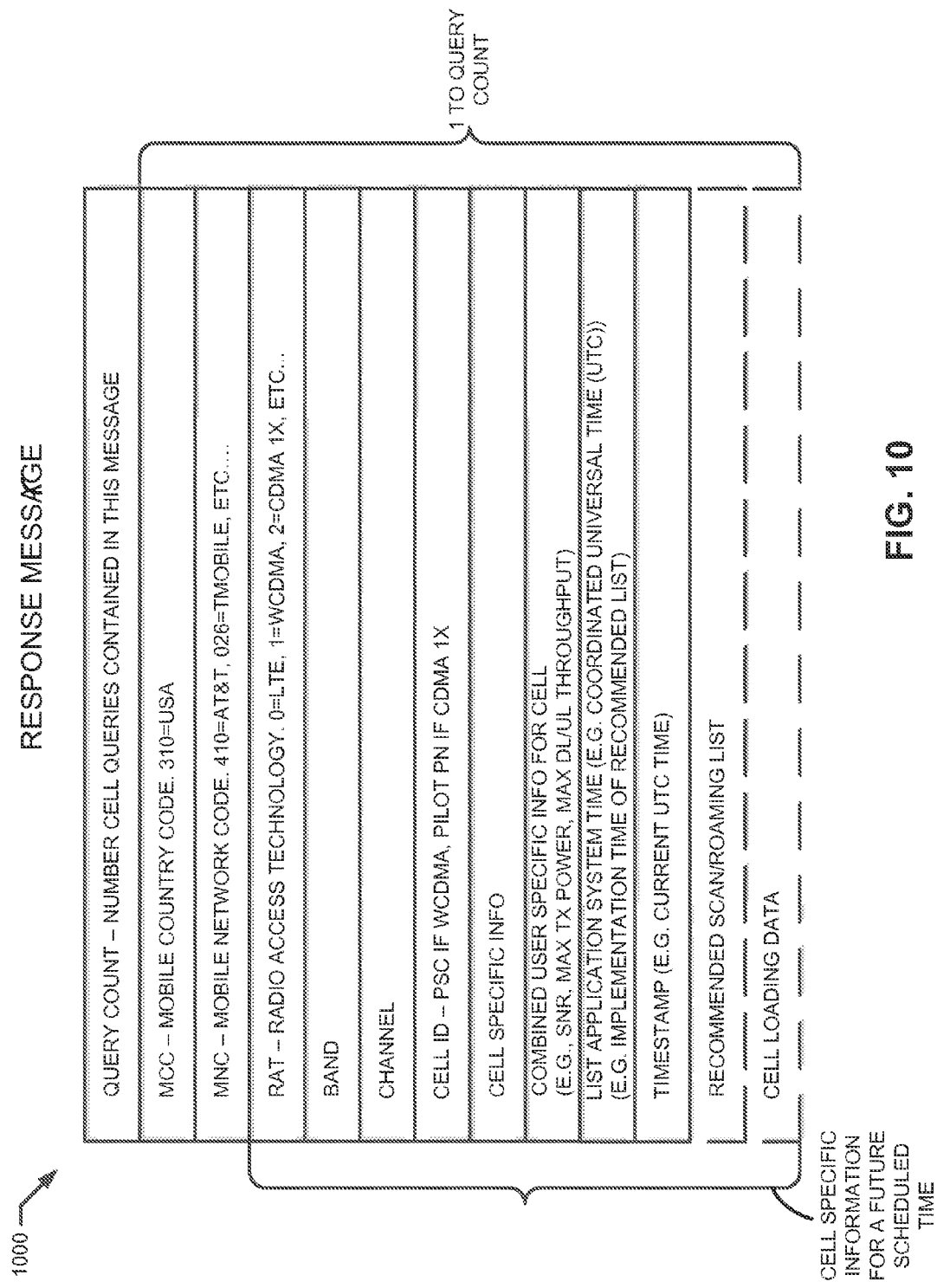
FIG. 10 is an illustration of an example server response message containing cell information including aggregated network cell data for a query count of cells.

FIG. 10 is an example diagram 1000 of a response message (e.g. cell information response message), sent by a server such as server 102, that includes cell information based at least on aggregated network cell data, in response to, for example, a cell query message received from a UE, such as the example cell query message of FIG. 9. The response message may include, for example, a query count representing the number of cell query responses contained in the message. For example, a UE may transmit a cell query message, as the one described with respect to FIG. 9, requesting data for a certain number of cells, and a server may respond with a response message including data for the number of cells requested. The response message may also include cell identification data such as MCC data, MNC data, RAT data, band data, channel data, cell id data, and other cell specific information. The response message may also include combined user specific information for a cell, such as data based on aggregated multi-cell and multi-UE data 234, which may be stored in a database such as database 104.

In addition, the response message may include a list application time, which may indicate the time the cell information is associated with. For example, the list application time may indicate that the provided cell information is associated with a time in the future. The cell information may also include one or more recommended lists such as scan lists or roaming lists. For example, the server may include a recommended scan list that was re-ordered by the base station in response to a received UE upload message, as described with respect to FIG. 9. The response message may also include cell loading data. For example, the cell loading data may include cell signal strength and quality metrics, such that if a received metric meets or exceeds a corresponding threshold maintained by a UE, the UE may proceed with giving effect to a received scan list, such as by replacing its current list with a received list, as described above.

Figure 11:
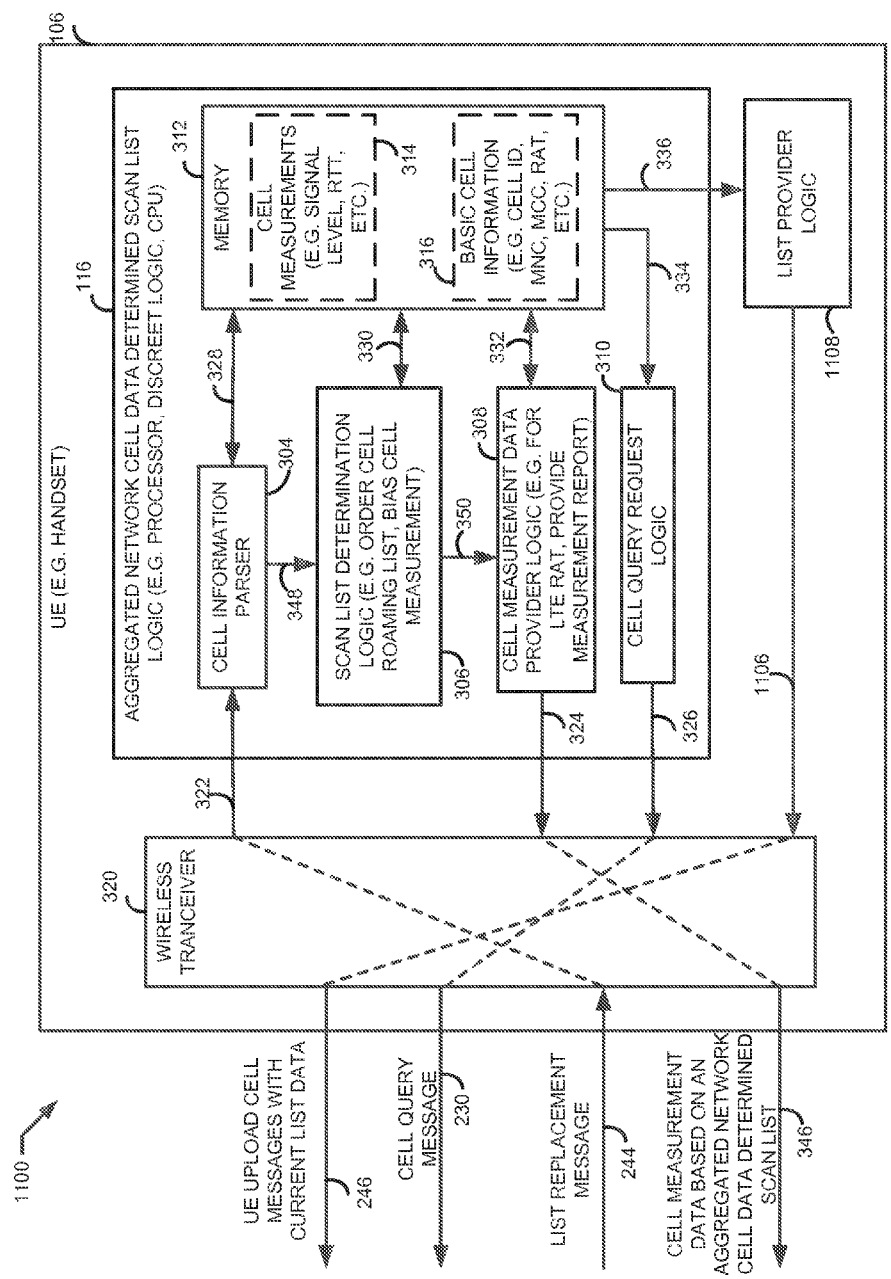
FIG. 11 is a more detailed functional block diagram of the example UE 106 in FIG. 1 providing further detail of aggregated network cell data determined scan list logic and including list provider logic.

FIG. 11 provides a functional block diagram 1100 that includes aspects of the functional block diagram of FIG. 3 and provides additional features of UE 106. As indicated in the diagram, the UE in this example diagram includes aggregated network cell data determined scan list logic 116, wireless transceiver 320, and list provider logic 1108. As described above with respect to FIG. 3, aggregated network cell data determined scan list logic 116 includes cell information parser 304, scan list determination logic 306, cell measurement data provider logic 308, cell query request logic 310, and memory 312. In this example, list provider logic 1108 may access data stored in memory 312 over communication link 336, including scan lists and roaming lists, that the UE maintains for either current use or future use. List provider logic 1108 is further operable to provide UE upload cell messages with list data 246 to, for example, server 102. List provider logic 1108 provides the UE upload cell messages with list data 246 to wireless transceiver 320 over communication link 1106 for transmission to server 102. For example, UE 106 may transmit a UE upload cell message with list data 246 that includes a scan list associated with a location that UE 106 may visit at a future time. In response to sending the UE upload cell message with list data 246, UE 106 may receive a list replacement message 244 from server 102 that includes a re-ordered scan list with better serving cells associated with higher priorities for the specified location and future time that is based on aggregated multi-cell and multi-UE data 234.

Figure 12:
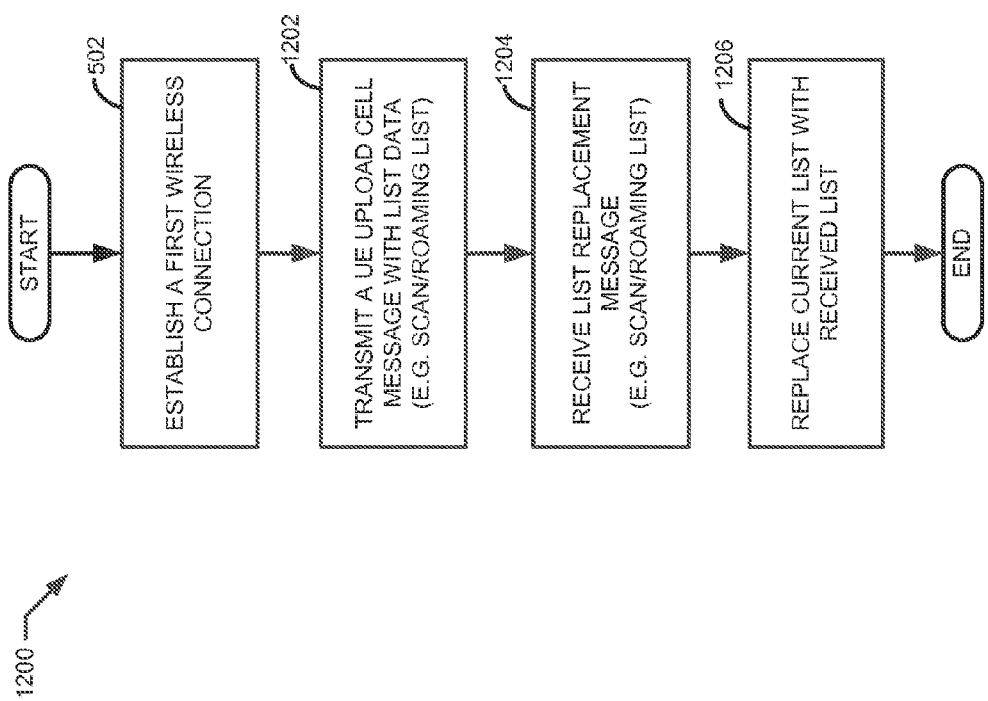
FIG. 12 is a flowchart of an example method for transmitting list data to, for example, a server, and for replacing a current list with a received list, whereby the received list is based on cell information data that is based on aggregated network cell data.

FIG. 12 is a flowchart 1200 of an example method at a UE, for example, such as at UE 106, that determines a scan list based on received cell information. The flowchart 1200 begins with establishing (502) a first wireless connection to, for example, a network via the base station, and transmitting (1202) a UE upload cell message that includes list data such as a scan list or roaming list. The flowchart also includes receiving (1204) a list replacement message that includes list information, such as a scan list or roaming list, that is based at least on aggregated network cell data, where, for example, the aggregated network cell data is based on aggregated multi-cell and multi-UE data from a plurality of UEs. The flowchart also includes replacing (1206) a current list with the received list, which may result in a re-ordered list of cells in a scan list or roaming list.

Figure 13:
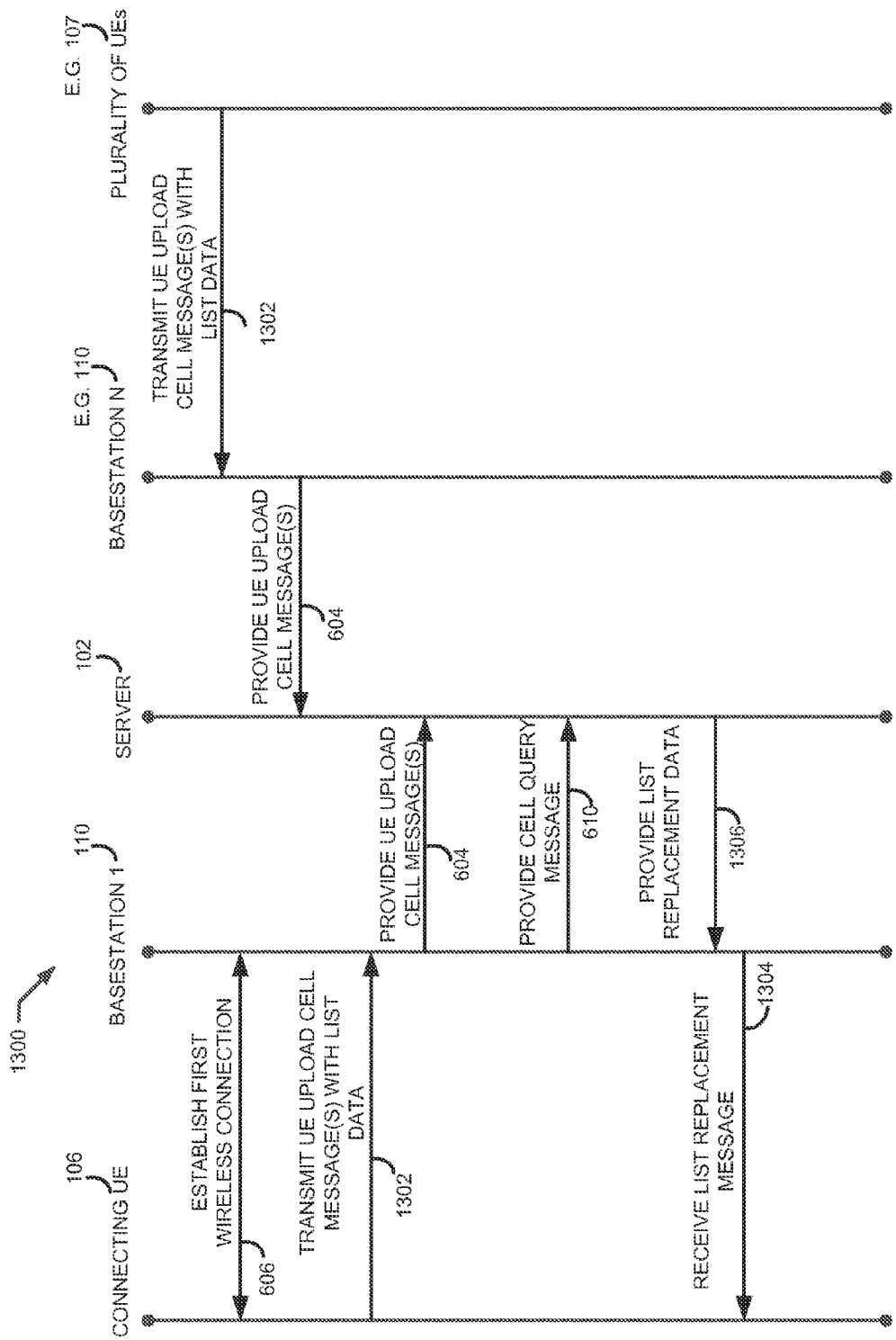
FIG. 13 is an example messaging diagram of an example system that includes aspects of the messaging diagram of FIG. 6, and wherein a UE may transmit a current list to a server and in return receive a replacement list from the server.

FIG. 13 provides a messaging diagram 1300 showing one example of messaging between a server (e.g. server 102), UEs (e.g. UE 106), and base stations (e.g. base station 110) that includes aspects of the messaging diagram of FIG. 6. Messaging diagram 1300 includes upload cell messages with list data from a plurality of UEs to base station N (1302), where base station N represents any number of base stations. For example, the UE upload cell message with list data may include a current scan list or roaming list, as described in the description of FIG. 12. The diagram includes messaging from base station N to a server that provides the UE upload cell messages (604). Messaging diagram 1300 also includes messaging between a connecting UE and base station 1 that establishes a wireless connection (606). The connecting UE may also transmit to base station 1 UE upload cell messages with list data (1302), which may then be provided to the server (604).

The diagram further includes a cell query message (608) transmitted from the connecting UE, now connected, to base station 1, as described with respect to FIG. 6. Base station 1 then provides the cell query message to the server (610). The messaging diagram includes the server providing list replacement data (1306) that may be for a future scheduled time and that is based on aggregated network cell data to base station 1 (612), for example, in response to the UE upload cell message with list data (1302). The connected UE then receives a list replacement message from base station 1 (1304) that includes a replacement list based on aggregated network cell data, whereby the UE may replace its current list with the received list.

By aggregating network cell data to decide or bias cell handoff and cell selection decisions, several advantages are contemplated. Wireless devices may take advantage of the aggregated cell information to undergo a handoff procedure to a cell that provides better service than other available cells. For example, although one available cell may provide a communication link with a stronger signal, aggregated cell information, which may be based on the observed characteristics of that cell by multiple devices, may indicate that throughput on that cell is minimal. As a result, a wireless device may experience more reliable service on another cell. Likewise, aggregated cell information for a given cell may indicate that the cell should be preferred over other available cells that cover a same area, for example, due to higher throughput measurements. Moreover, aggregated cell information may allow more efficient handoff decisions to be made as a wireless device moves along a route. For example, aggregated cell information may be utilized to determine coverage area and predicted reliability of upcoming cells, allowing a moving wireless device to handoff to those cells that cover more of an area with higher reliability. As a result, inefficient handoff decisions may be minimized. Other advantages will be recognized by those of ordinary skill in the art.

Although features and elements are described above in particular combinations, each feature or element can be used alone without the other features and elements or in various combinations with or without other features and elements. The apparatus described herein may be manufactured by using a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

The foregoing description has been presented for the purposes of illustration and description. It is not intended to be exhaustive or to limit the invention to the exemplary embodiments disclosed. Many modifications and variations are possible in light of the above teachings. It is intended that the scope of the invention be limited not by this detailed description of examples, but rather by the claims appended hereto. The above detailed description of the embodiments and the examples described therein have been presented for the purposes of illustration and description only and not by limitation. It is therefore contemplated that the present invention cover any and all modifications, variations or equivalents that fall within the spirit and scope of the basic underlying principles disclosed above and claimed herein.

What is claimed is:

1. A method of providing wireless access to a radio access network for a user equipment (UE), the method comprising at a server:
obtaining a plurality of UE upload cell messages from a plurality of UEs served by different cells, wherein each UE upload cell message comprises cell specific data and corresponding UE specific data for a specific cell;
aggregating network cell data based at least on the cell specific data and the corresponding UE specific data of the plurality of UE upload cell messages;
receiving a cell query message from the UE that includes a particular day and time in the future; and
in response to receiving the cell query message, providing cell specific information for the particular day and time in the future to the UE based at least on the aggregated network cell data.

2. The method of claim 1 wherein providing cell specific information for the particular time in the future comprises providing at least one of: a recommended scan list, a recommended roaming list, an observed maximum downlink throughput rate, and an observed maximum downlink throughput rate.

3. The method of claim 1 wherein providing cell specific information for the particular time in the future comprises providing a recommended cell for at least one of: re-ordering by the UE a scan list to elevate the position of the recommended cell, re-ordering by the UE a cell roaming list to elevate the position of the recommended cell, and biasing by the UE a cell measurement of the recommended cell.

4. The method of claim 1 wherein providing cell specific information for the particular time in the future comprises providing a recommended radio access technology for at least one of: re-ordering a scan list by the UE to elevate the position of the recommended cell, re-ordering a radio access technology roaming list by the UE to elevate the position of the recommended radio access technology, and biasing by the UE a cell measurement of the recommended radio access technology.

5. The method of claim 1 wherein the cell query message identifies a future location of the UE, and wherein the provided cell specific information is provided for the future location of the UE.

6. A server comprising:
multi-cell and multi-UE data aggregator logic configured to:

receive a plurality of UE upload cell messages from a plurality of UEs served by different cells, wherein each UE upload cell message comprises cell specific data and corresponding UE specific data for a specific cell; and aggregate network cell data based at least on the cell specific data and corresponding UE specific data of the plurality of UE upload cell messages; and cell information provider logic configured to:
receive a cell query message from a UE that includes a particular day and time in a future; and in response to receiving the cell query message, provide cell specific information for the particular day and time in the future to the UE based at least on the aggregated network cell data.

7. The server of claim 6 comprising cell and UE list replacement logic configured to provide to the UE a list replacement message comprising at least one of a re-ordered scan list and a re-ordered roaming list.

8. The server of claim 6 comprising cell recommendation logic configured to provide a cell recommendation for at least one of: re-ordering a scan list by the UE to elevate the position of the recommended cell, re-ordering a cell roaming list by the UE to elevate the position of the recommended cell, and biasing by the UE a cell measurement of the recommended cell.

9. The server of claim 6, wherein the cell query message identifies a future location of the UE, and wherein the provided cell specific information is provided for the future location of the UE.

10. A method of providing wireless access to a radio access network for a user equipment (UE), the method comprising at a server:

obtaining a plurality of UE upload cell messages from a plurality of UEs served by different cells, wherein each UE upload cell message comprises cell specific data and corresponding UE specific data for a specific cell;

aggregating network cell data based at least on the cell specific data and the corresponding UE specific data of the plurality of UE upload cell messages; and providing cell specific information for a future scheduled time to the UE based at least on the aggregated network cell data, wherein providing cell specific information for the future scheduled time comprises providing a recommended radio access technology for at least one of: re-ordering a scan list by the UE to elevate the position of the recommended cell, re-ordering a radio access technology roaming list by the UE to elevate the position of the recommended radio access technology, and biasing by the UE a cell measurement of the recommended radio access technology.

11. A server comprising:
multi-cell and multi-UE data aggregator logic configured to:

receive a plurality of UE upload cell messages from a plurality of UEs served by different cells, wherein each UE upload cell message comprises cell specific data and corresponding UE specific data for a specific cell; and aggregate network cell data based at least on the cell specific data and corresponding UE specific data of the plurality of UE upload cell messages; and cell information provider logic configured to provide cell specific information for a future scheduled time to a UE based at least on the aggregated network cell data, wherein the cell information provider logic is configured to provide a recommended radio access technology for at least one of: re-ordering a scan list by the UE to elevate the position of the recommended cell, re-ordering a radio access technology roaming list by the UE to elevate the position of the recommended radio access technology, and biasing by the UE a cell measurement of the recommended radio access technology.

* * * * *